US006026948A

United States Patent [19]

Hasizume

[11] Patent Number: 6,026,948

[45] Date of Patent: Feb. 22, 2000

[54] CONVEYING AND FEEDING METHOD AND APPARATUS FOR FILM IN A FILM CARTRIDGE

[75] Inventor: Keiji Hasizume, Wakayama-ken, Japan

[73] Assignee: Noritsu Koki Co., Ltd., Wakayama, Japan

[21] Appl. No.: 08/997,820

[22] Filed: Dec. 24, 1997

[30] Foreign Application Priority Data

Dec. 25, 1996 [JP] Japan .................................... 8-345141

[51] Int. Cl.$^{7}$ ..................................................... B65G 47/26

[52] U.S. Cl. ....................... 198/451; 198/459.7; 198/531; 198/532; 193/35 G; 396/599

[58] Field of Search .................................... 198/451, 531, 198/532, 459.6, 459.7; 396/594, 599; 193/35 G

[56] References Cited

U.S. PATENT DOCUMENTS 4,076,135 2/1978 Klose .................................... 193/35 G

FOREIGN PATENT DOCUMENTS 0469594 2/1992 European Pat. Off. .
0676664 10/1995 European Pat. Off. .
0717310 6/1996 European Pat. Off. .
0791852 8/1997 European Pat. Off. .
7-36120 2/1995 Japan .
7-281386 10/1995 Japan .
7-325350 12/1995 Japan .
8-166638 6/1996 Japan .

*Primary Examiner*—William E. Terrell
*Assistant Examiner*—Mark A. Deuble
*Attorney, Agent, or Firm*—Smith Patent Office

[57] ABSTRACT

A conveying and feeding apparatus for conveying and constantly feeding a film cartridge one by one so as to feed the next process where a plurality of cartridges are conveyed continuously to a cartridge housing unit or a printing machine. A conveying portion comprises a conveyer belt and a guide board, and near its downstream end, a cartridge stopper mechanism is provided. This stopper mechanism comprises a first stopper member and a second stopper member. When the first stopper member stops a forefront cartridge T, the second stopper member is in a release position. Further, when the first stopper member is in a release position, the second stopper member is in a closed position so that the cartridge T can be constantly sent one by one.

12 Claims, 8 Drawing Sheets

CONVEYING AND FEEDING METHOD AND APPARATUS FOR FILM IN A FILM CARTRIDGE

BACKGROUND OF THE INVENTION

1. Field of the Invention

The present invention relates to a feeding method and apparatus for feeding a photographic printing machine and the like with a film in a film cartridge.

2. Discussion of the Related Art

Recently, a new type of film cartridge has been standardized which enables the film in the cartridge to be treated through the developing and the printing/exposing processes after being photographed. This new type of film cartridge enables the film to be separated from the cartridge automatically by inserting a tool into the cartridge and disengaging the inner end of the film therefrom. Therefore while in the developing process, the film can be taken out from the cartridge and developed and while in the printing process, the film can be drawn out from the cartridge and can be re-wound into the cartridge and held therein after it is printed/exposed.

Various kinds of new developing machines and printing/exposing machines have been proposed for developing and printing/exposing this new type of film cartridge. For example, Japanese Patent Publication No. 07-281386 proposes a film development processing machine which can continuously perform the processes of developing, fixing, drying and the like.

The above mentioned film development processing machine uses a cartridge case for holding a plurality of cartridges. A film development processing machine has been proposed to be equipped with the new type of cartridge case (in the present invention, hereafter referred to as a cartridge panel) in order to improve the work efficiency for the processes of taking out and re-housing the film.

Additionally, as an attempt to automate a printing machine, an apparatus where a plurality of cartridges are set on a turn table and their prints are processed efficiently has been proposed. Further, a cartridge feeding apparatus for feeding the printing machine with cartridges is shown in Japanese Patent Publication No. 07-325350 and a cartridge housing unit for continuously supplying the printing machine or the cartridge feeding apparatus with a cartridge is shown in Japanese Patent Publication No. 08-166638.

The above mentioned cartridge housing unit disclosed by Japanese Patent Publication No. 08-166638 is shown in FIG. 10. This unit drops the cartridges one by one with a predetermined attitude for automatically supplying a turn table type of printing machine with the cartridge. This unit includes a cartridge housing portion 51, a cartridge inserting through hole 53, a drop guide 55, a take-out portion 34, a film cartridge T, a cartridge housing unit 30, and an attitude adjusting means PC. The drop guide 55 comprises a drop restricting portion 55*a* and a slant receiving portion 55*b*. A cover member 33 of the drop guide 55 is also provided. This cartridge housing unit 30 serves also as a storage means for storing a certain plurality of cartridges therein.

SUMMARY OF THE INVENTION

Although the above described cartridge panel is developed so that the film cartridge is automatically supplied to the film developing machine, this cartridge panel can be also applied to a turn table type of printing machine. The turn table type of printing machine, however, currently employs the cartridge housing unit mentioned above and, therefore, it is not automatically supplied directly by the cartridge panel.

When the cartridge housing unit is installed in the turn table type of printing machine for feeding it with a film cartridge, the film cartridge is supplied in a manner that one cartridge housing unit is replaced by another one when the films in the cartridges packed previously in one cartridge housing unit have been processed. The cartridges have been previously inserted into the cartridge housing unit by hand through the inserting hole. Therefore, after the developing process, the cartridges with developed film have to be taken off the cartridge panel again by hand, and then they have to be inserted into the cartridge housing unit by hand.

When the amount to be processed by the printing machine is small, the system in which the cartridge housing units are changed in turn has an advantage over the system equipped with an apparatus for automatically feeding cartridges from a cartridge panel because of the lower costs of installation. However, when the amount to be printed increases, the cartridge supply work by hand becomes annoying and it does not allow automatic feeding of the cartridges.

Accordingly, it may be considered that the plural cartridge panels are stored by laying one upon another, and then the cartridge is separately dropped off the panel by controlling the panels one by one. Then the cartridges are aligned, conveyed and fed automatically to the turn table type of printing machine directly or through the above mentioned cartridge housing unit.

A film cartridge feeding apparatus for feeding a cartridge separately from the above mentioned cartridge panel has been previously proposed. However, the employment of this kind of film cartridge feeding apparatus without any other devices may cause the following problem while automatically feeding the turn table type of printing machine with a film cartridge.

When this type of cartridge housing unit is employed, a number of cartridges are housed in the housing vertically and are dropped and sent one by one with a predetermined sending attitude from the lower portion thereof. Therefore, when the cartridge is continuously delivered to this cartridge housing unit from the conveying portion of the film cartridge feeding apparatus mentioned above, a mismatch of timing in the cartridge housing unit between the acceptance and the delivery of the cartridge may cause over feeding and result in a failure in smooth operation.

When the cartridge is directly conveyed and fed from the above mentioned conveying portion of the feeding apparatus to the supply side of the turn table of printing machine without employing the cartridge housing unit, a mismatch of timing might cause a stack of cartridges on the receiving area of the supply side of the turn table and result in a failure in normal feeding operation.

The present invention is considered to solve the problems of the conventional method and apparatus and convey and feed a plurality of cartridges to the cartridge housing unit or the printing machine. Accordingly, the object of the present invention is to provide a feeding method and an apparatus which is capable of delivering cartridges one by one in a predetermined timing from a downstream end of a conveying path to the end of the path and beyond by controlling a cartridge conveying operation nearby the downstream end of the conveying path.

The present invention employs a film cartridge conveying and feeding method as a means to solve the problem mentioned above. The method comprising the steps of:

conveying a film cartridge received in an upstream side along a conveying path;

stopping conveyance of a forefront cartridge and then stopping conveyances of cartridges following in turn in a downstream side of the path;

releasing and delivering the forefront cartridge off the path while holding the cartridge next to the forefront one in its position;

releasing the cartridge next to the forefront one and conveying it to a position previously held by the forefront cartridge and stopping its conveyance in this position; and repeating the steps of releasing and delivering the forefront cartridge and releasing the cartridge next to the forefront one so as to feed cartridges one by one.

As an apparatus to realize the method described above, a film cartridge conveying and feeding apparatus comprises:

a cartridge stopper means provided in a downstream end of a conveying path for receiving a film cartridge and conveying the first film cartridge to a predetermined position, the cartridge stopper means comprising:

a first stopper member which stops the first film cartridge and then stops following film cartridges in turn;

a second stopper member which stops a second film cartridge adjacent to the first film cartridge when the first stopper member is moved to a release position; and a driving portion for driving the first and the second stopper members synchronously with each other.

According to the method and apparatus described above, a plurality of cartridges are fed continuously, and by controlling their flow, each cartridge is sent one by one at a predetermined time to a cartridge housing unit or a printing machine in the next stage.

According to the method and apparatus described above, the forefront or first film cartridge and the next adjacent one are stopped in turn with a stopper means. That is while one is released and conveyed, the other one is stopped, and while one is stopped, the other one is released and conveyed. Then by repeating these operations, the cartridges are supplied one by one from the downstream end of the conveying path to the outside thereof.

When the feed timing of each cartridge fed one by one is coordinated with that of the apparatus in the next stage, the cartridge is fed to the next stage at its necessary timing. Therefore the cartridge can be conveyed smoothly without disturbing the operation of the apparatus in the next stage and without dropping the cartridge out of the path due to a collision between the cartridges on the conveying path.

BRIEF DESCRIPTION OF THE DRAWINGS

The above and other objects and features of the present invention will be clearly understood from the following description with respect to a preferred embodiment thereof when considered in conjunction with the accompanying drawings, wherein the same reference numerals have been used to denote the same or similar parts or elements, and in which.

Other features and advantages of the present invention will be made clear by the following description of the preferred embodiments accompanying with the drawings.

DETAILED DESCRIPTION OF THE PREFERRED EMBODIMENTS

Figure 1:
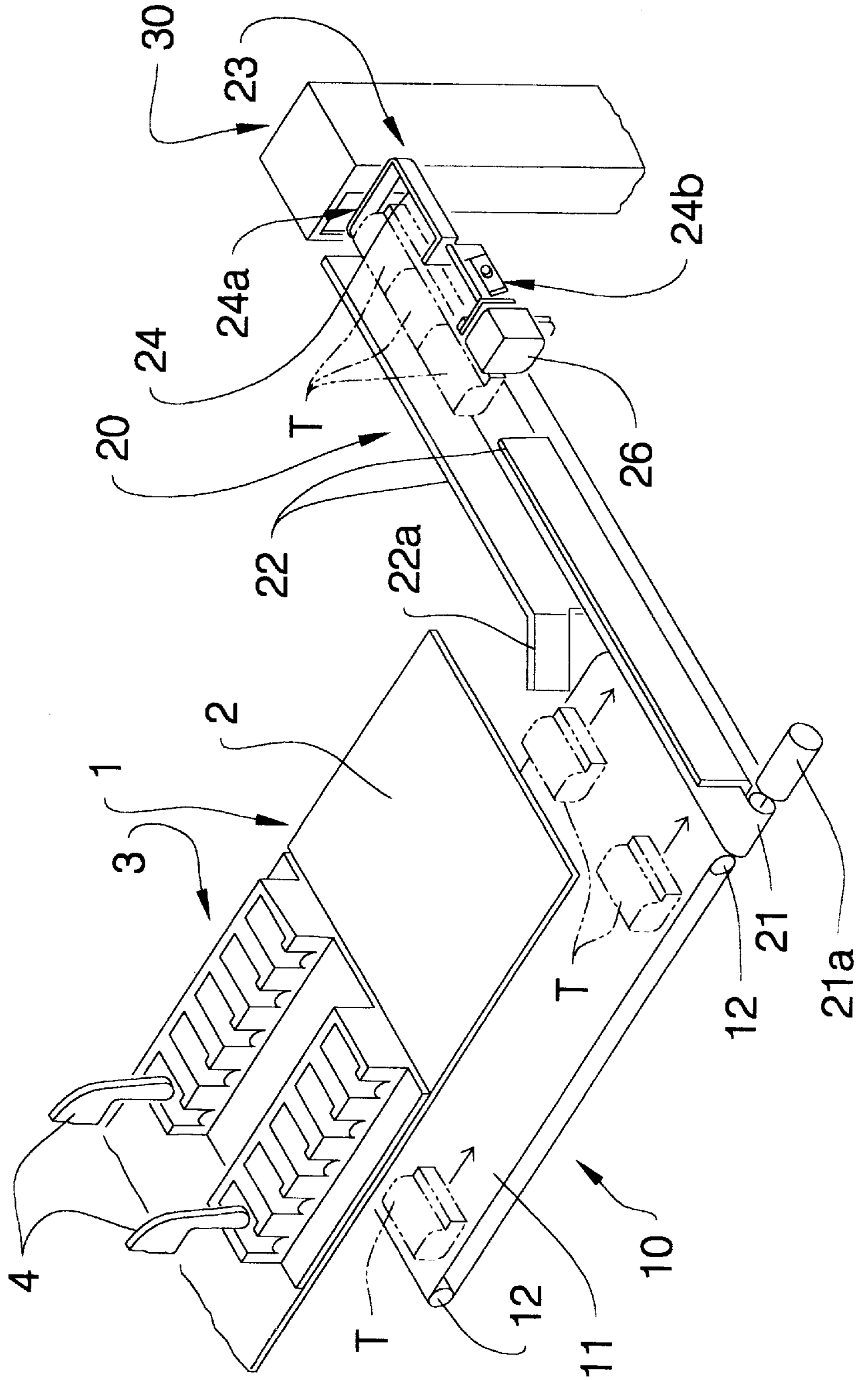
FIG. 1 is an overall perspective view of the film in cartridge conveying and feeding apparatus according to an embodiment of the present invention.

An embodiment of the present invention with reference to the attached drawings will now be described. FIG. 1 is an overall perspective view of the apparatus for performing the film in cartridge conveying and feeding method of the present invention. Although this type of conveying and feeding apparatus comprises mainly a second conveying means 20 as will be described later, a cartridge separating and feeding apparatus 1 for separating a cartridge from a cartridge panel 3 and a first conveying means 10 are additionally illustrated in the upstream position in FIG. 1. This shows an example where this conveying and feeding apparatus is used as a conveying apparatus for automatically feeding, for example, a turn table type of a printing machine with a film in a film cartridge. It is needless to say that this type of conveying and feeding apparatus is not limited to the embodiment shown in the drawings.

As the cartridge separating and feeding apparatus 1 is not the main part of the present invention, only the members necessary for describing its basic function are shown. A holding board 2 holds a cartridge panel 3 and when a cartridge separating arm 4 is inserted in the position shown in FIG. 1, two cartridges are separated from the panel 3 at the same time. They are dropped on the first conveying means 10 to be conveyed to the second conveying means.

Although the detailed structure of the cartridge panel 3 is not shown, it has plural lines of housing pockets (two lines being shown in FIG. 1). Each of the housing pockets holds plural cartridges (five cartridges shown) on the panel board. The cartridge panel 3 is made to have a plurality of housing pockets into which a plurality of cartridges T are inserted from the back side. The inserted cartridge T is held between a boss formed on one side wall of the elastic holding member and another side wall by placing the cartridge so that the boss is inserted into the hole of a spool shaft and pressing the cartridge. An opening is used to read a bar code indicator (ID indicator) etc. written on the outer surface of the cartridge from above the opening.

When the cartridge is fed continuously by the use of this kind of cartridge panel 3, a plurality of cartridge panels 3 may be stored by stacking one upon another. These in turn may then be set on the holding board 2 one by one.

Figure 2:
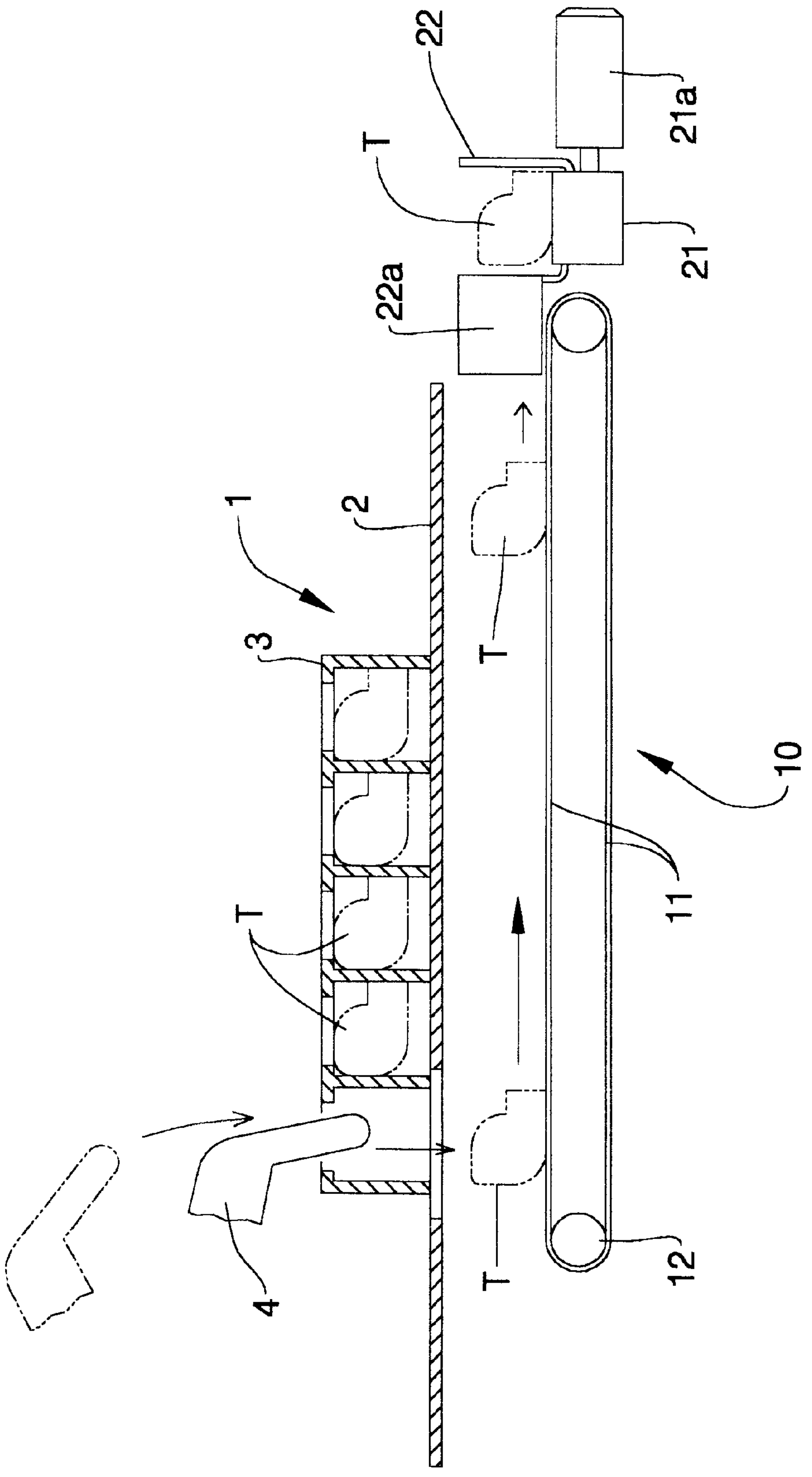
FIG. 2 is a side sectional view near the cartridge separating and feeding apparatus.

The first conveying means 10 includes an endless belt 11 provided between two pulleys 12 to convey two cartridges in a parallel direction and drop them synchronously from the cartridge separating and feeding apparatus 1. FIG. 2 is a side sectional view illustrating the cartridge separating and feeding apparatus 1 and the first conveying means 10.

The second conveying portion 20 comprises, as shown in FIG. 1, a guide board 22 provided along the conveying path for conveying the cartridge from upstream to downstream, an endless belt 21 provided between two drive rollers 21*b,* and a drive motor 21*a*. At an upstream point where the cartridge T is received, as shown, the guide board 22 is partially cut to form a receiving board 22*a*. Near the downstream end of the second conveying means, a stopper means 23 is provided.

Figure 3:
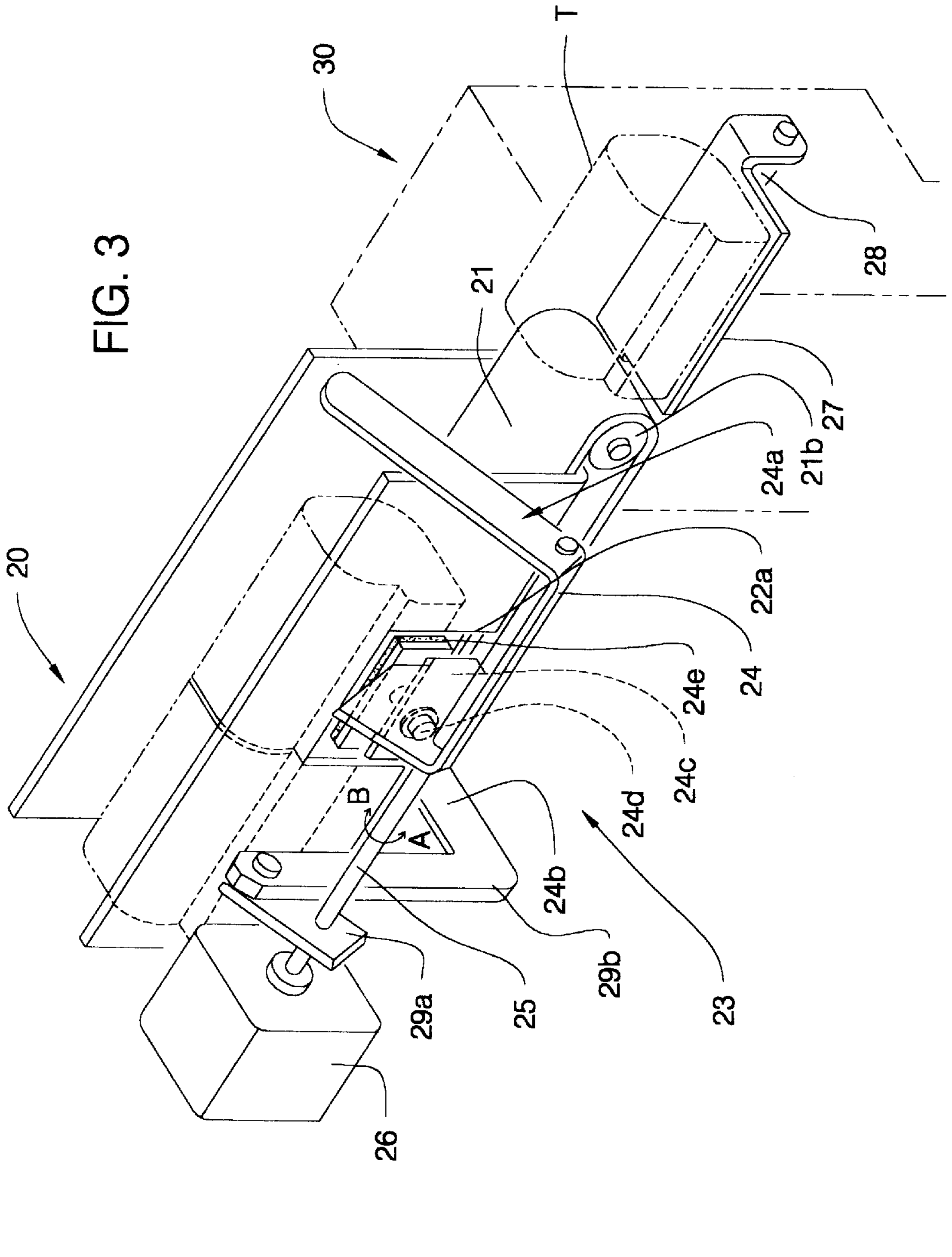
FIG. 3 is an enlarged partial perspective view near the downstream portion of the second conveying portion.
Figure 4:
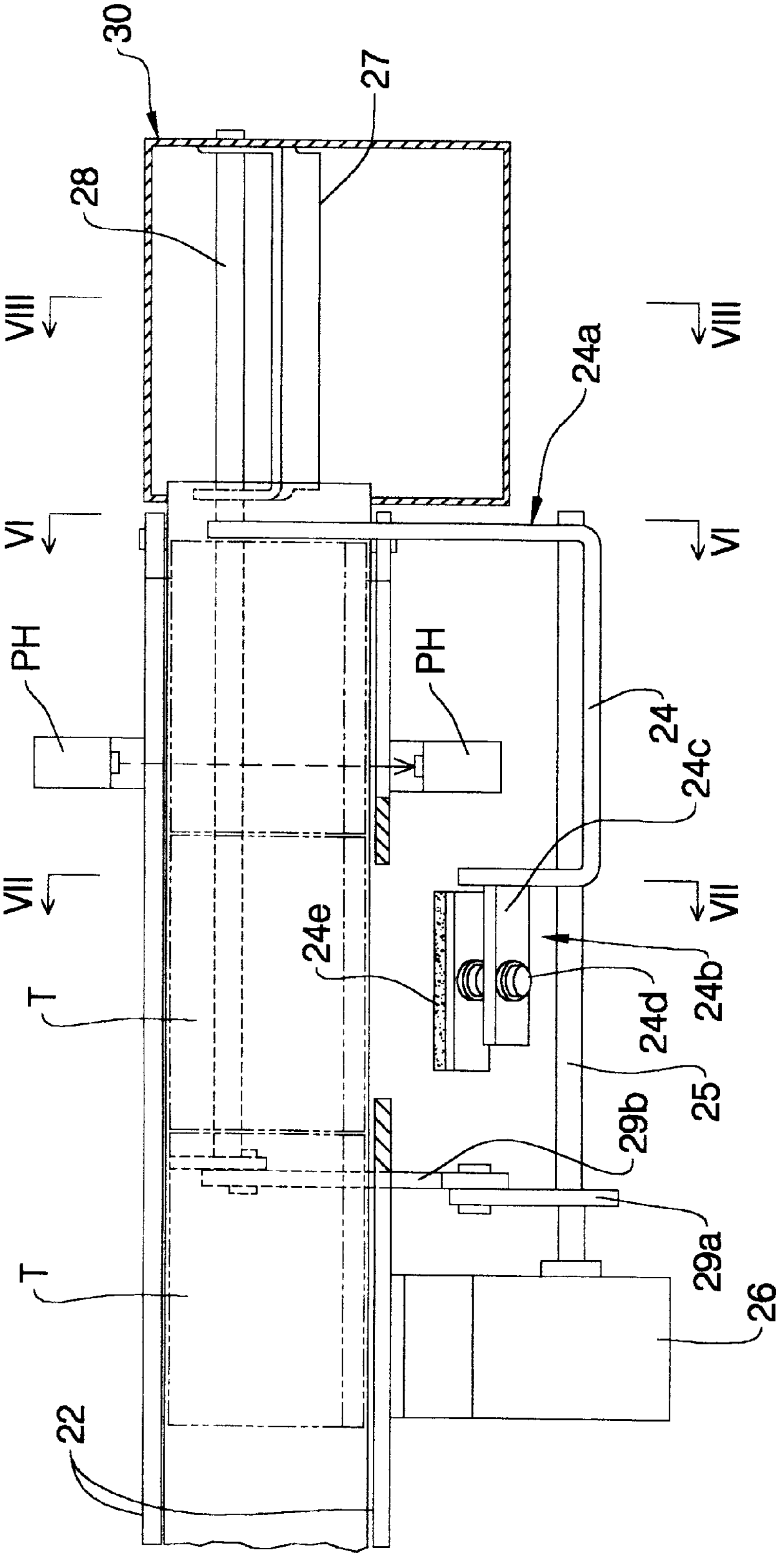
FIG. 4 is a partial sectional view near the downstream portion of the second conveying portion.
Figure 5:
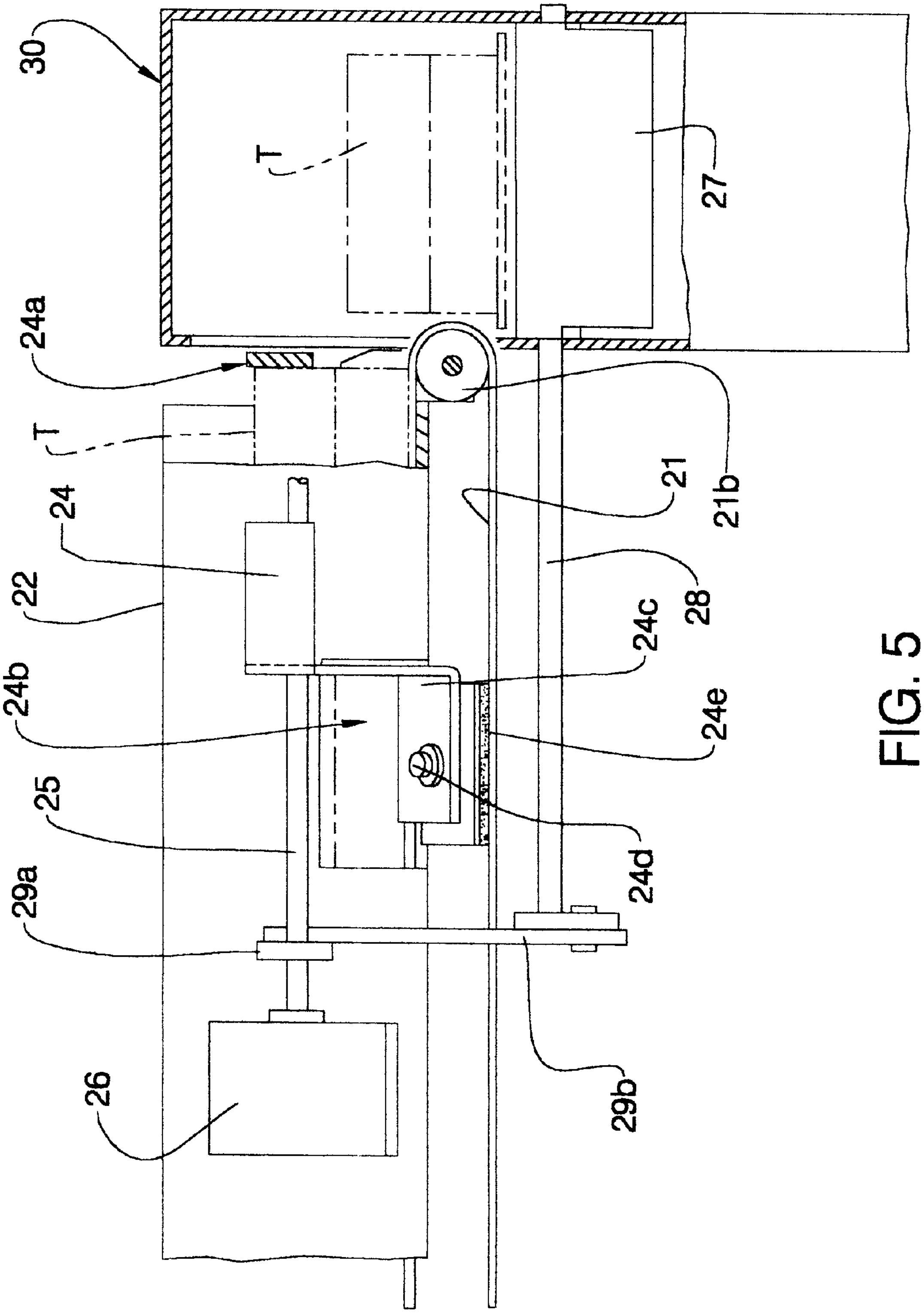
FIG. 5 is another partial sectional view near the downstream portion of the second conveying portion.
Figure 6:
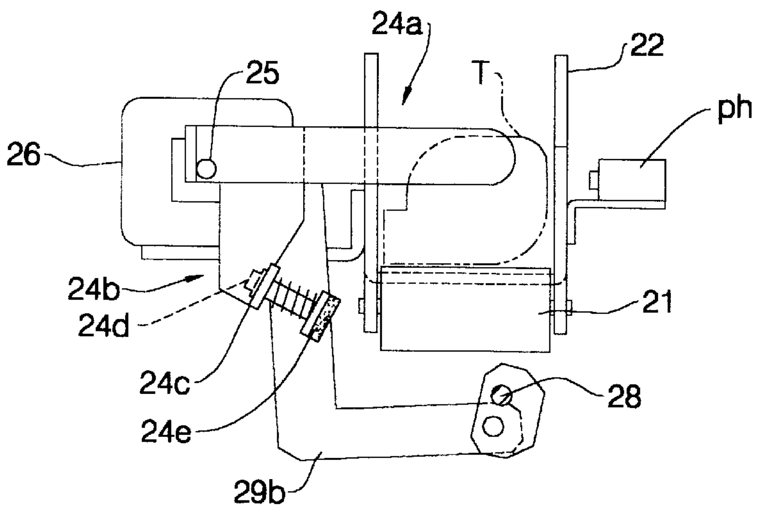
FIG. 6 is a cross sectional view taken along line VI—VI in FIG. 4.
Figure 7:
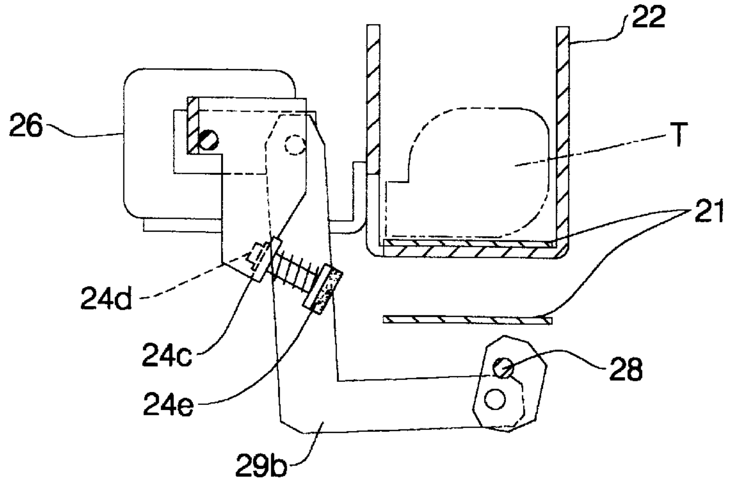
FIG. 7 is a cross sectional view taken along line VII—VII in FIG. 4.

FIGS. 3–5 illustrate various views of an enlarged downstream portion of the second conveying portion 20 according to this embodiment. The second conveying portion 20 is provided with the cartridge stopper means 23 for stopping the cartridge T. This cartridge stopper means 23 comprises a first stopper member 24*a* and a second stopper member 24*b*. In the following description, FIGS. 6, 7 and 8 will be also referred to, and these figures are cross sectional views taken along lines VI—VI, VII—VII and VIII—VIII in FIG. 4 respectively.

The first stopper member 24*a* and the second stopper member 24*b* are formed respectively on each end of an arm 24 having an approximately U-shaped cross section. The first stopper member 24*a* is formed to be a long arm and the second stopper member 24*b* comprises a short arm and a pad 24*e* attached on the end thereof. The end of the second stopper member 24*b* is, as shown, bent to be L-shaped and the pad 24*e* is attached to a fixing plate which is fixed to a bolt 24*d* which is engaged by its thread with an L-shaped member 24*c* formed on the end of the second stopper member 24*b*.

A connecting rod 25 runs through the long and the short arms of the first and the second stopper members to rotate them synchronously, and its one end is connected to a rotary solenoid 26. The ends of the first and the second stopper members 24*a,* 24*b* are arranged to have a different angle with each other. As shown in FIG. 3, when the first stopper member 24*a* is rotated to an upper position, the pad 24*e* of the second stopper member 24*b* holds the side surface of the cartridge T. In order to avoid any interference of the second stopper member 24*b* against the guide board 22 in this position, the side of the guide board 22 is partially cut away as shown by 22*a*.

A rotary flap 27 is installed in the cartridge housing unit 30 out of the downstream end of the second conveying portion 20. This rotary flap 27 is connected to the connecting rod 25 through a connecting rod 28 and rotary levers 29*a,* 29*b* so as to be driven synchronously with the stopper means 23.

A cartridge sensor PH is installed in the vicinity of the downstream end of the second conveying portion 20 to detect whether the forefront cartridge T is on the conveying path or not. The sensor PH detects the cartridge T when the emitted light is interrupted by the cartridge T. An ultrasonic sensor may also be employed as the cartridge sensor PH instead of an optical type of sensor.

The operation of the conveying and feeding apparatus of the present embodiment will now be described. The cartridge T is delivered to the second conveying portion 20 at the upstream side of the conveyer belt 21 and it is then aligned and sent downstream.

Basically, the conveying and feeding apparatus is designed to convey the cartridges T continuously by the conveyer belt 21 to a printing machine (not shown) or the cartridge housing unit 30 as described above. When the processing or discharge timing of the printing machine or the cartridge housing unit 30 does not coincide with the feeding timing of this conveying and feeding apparatus, the discharging of cartridges from the cartridge housing unit 30 etc. might not operate smoothly.

Accordingly, the conveying and feeding apparatus is designed to send the cartridges T one by one constantly by the cartridge stopper means 23. When a plurality of cartridges are sent as shown in FIG. 1, the forefront cartridge T is stopped during its conveyance by the first stopper member 24*a* of the cartridge stopper means 23. The conveyer belt 21 continues to be driven, so the conveyer belt 21 always keeps circulating and moving. When the forefront cartridge T is stopped, the following cartridges T are stopped in turn by contacting the preceding ones respectively. Then, the first and the second stopper members 24*a*, 24*b* are rotated by the rotary solenoid 26 (rotating direction A shown in FIG. 3) in order to send the forefront cartridge T to the cartridge housing unit 30 etc. in the next stage.

Figure 9:
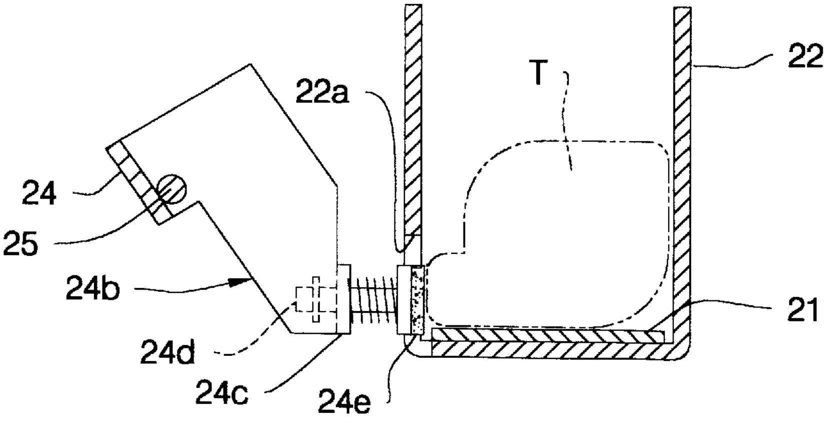
FIG. 9 illustrates a holding operation of the second film cartridge.
Figure 10:
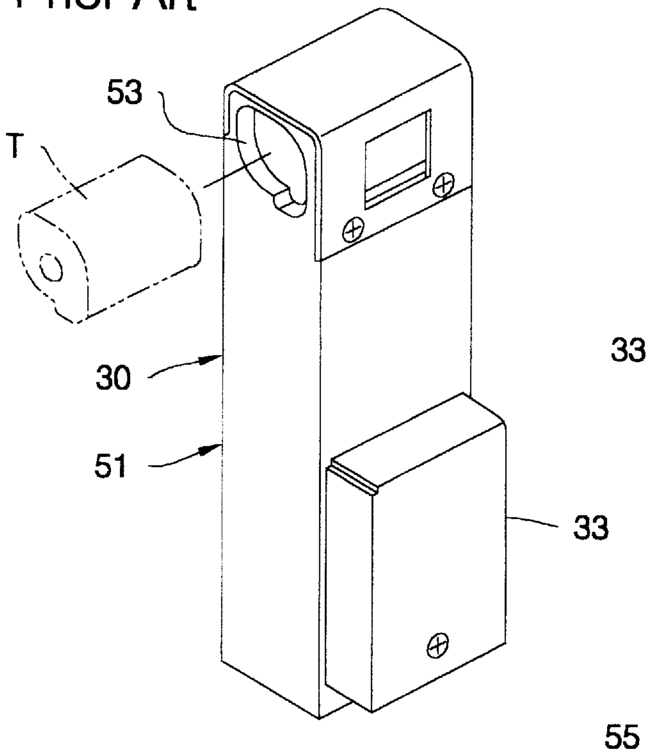
FIG. 10 (a) Prior Art
FIG. 10(*a*) and FIG. 10(*b*) are perspective views of the cartridge housing unit.
Figure 10:
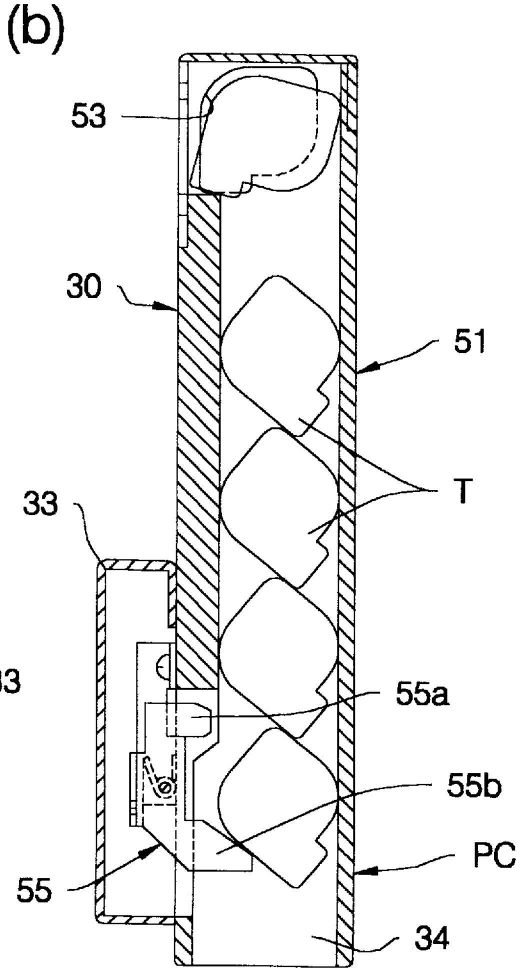
FIG. 10 (b) Prior Art

When the cartridge stopper means 23 is rotated, the first stopper member 24*a* is moved to the release position and the forefront cartridge T becomes movable and starts moving by action of the conveyer belt 21. When the first stopper member 24*a* rotates, the second stopper member 24*b* also rotates synchronously, as shown in FIG. 3, and the pad 24*e* attached to its front end is brought into contact with the cartridge T next to the forefront cartridge to stop its conveyance (see FIG. 9).

While the cartridge T next to the forefront one is held by the second stopper member 24*b* so as not to be moved, the forefront cartridge T is sent out from the downstream end of the conveyer belt 21 and is positioned on the flap 27. When the transfer procedure of the forefront cartridge is finished, the first and the second stopper members 24*a*, 24*b* are rotated to the direction opposite to that mentioned above (rotating direction B shown in FIG. 3). The contact between the second stopper member 24*b* with the next cartridge T is released so that it can be conveyed to the forefront cartridge position. At the same time, the first stopper member 24*a* is moved to a closed position. Therefore, by selecting a proper operational timing of the rotary solenoid 26 in response to the processing conditions in the next stage, a smoother transfer procedure can be accomplished.

Figure 8:
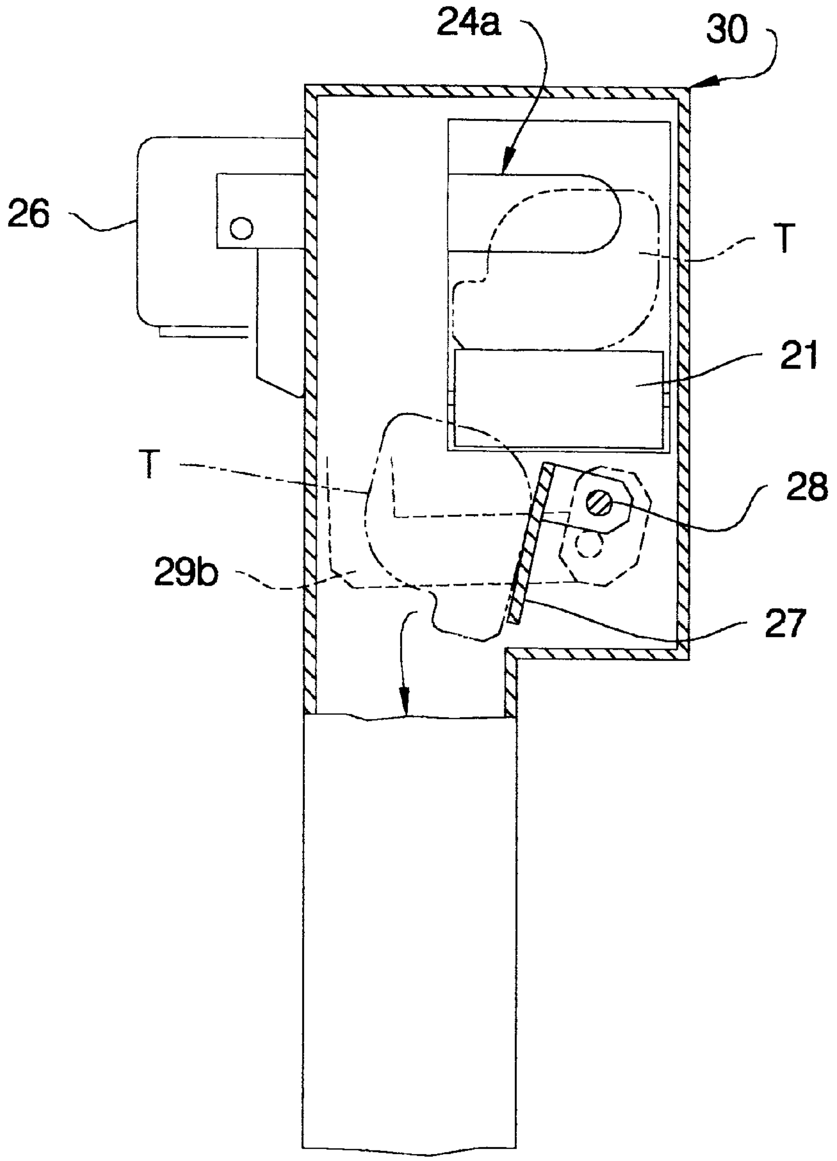
FIG. 8 is a cross sectional view taken along line VIII—VIII in FIG. 4.

By repeating the above mentioned processes, cartridges T can be sent one by one to the cartridge housing unit 30 or the printing machine etc. in the next stage. While the forefront cartridge T is sent to the cartridge housing unit 30 first, the cartridge T is received by the flap 27 with its horizontal position as shown in FIG. 3. Then, when the first stopper member 24*a* is rotated to a closed position and the second stopper member 24*b* releases contact with the next cartridge T in order to move the next cartridge to the forefront cartridge position, the connecting rod 28 is rotated synchronously with the rotation of the above mentioned stopper members and the flap 27 is moved downward and the forefront cartridge T falls down as shown in FIG. 8.

In above embodiment, the second conveying portion 20 is illustrated as a straight and horizontally installed piece of equipment. The second conveying portion 20 can also be slanted. In the case of a slanted design, the slant angle may be any value if it is less than vertical. When the slant angle is less than 30 degrees the conveyer belt 21 may be installed. When it is more than 30 degrees, the downward movement along the slant may be depend on gravity so the conveyer belt 21 is not necessarily required. In addition, although the second conveying portion 20 is illustrated as straight, it may be bent up and down or to other horizontal directions.

To add to that, although the flap 27 is illustrated as being installed within the upper portion of the housing body of the cartridge housing unit 30, the flap 27 may be installed on the upper portion of the housing body by making it an open type.

Furthermore, when the cartridge T is fed directly from the second conveying portion 20 to the turn table type of printing machine, the flap 27 may not be installed.

Further, the cartridge stopper means 23 is illustrated as of the rotary arm type and various kinds of systems may be employed for it. For example, such system may be employed in which the first stopper member 24*a* is a horizontal bar moving up and down. The second stopper member 24*b* then moves perpendicularly to the cartridge forward and backward movement Both members can be controlled synchronously by a cam mechanism or electric means. The rotary solenoid may also be replaced by a motor.

As described above in detail, the conveying and feeding method and apparatus according to the present invention enables a cartridge to be sent out one by one from the end of the conveying path to the next stage by stopping the forefront cartridge and the next one while another one is released and vice versa. This achieves the effect that the cartridge can be fed constantly without interrupting the operation of the apparatus in the next stage and it also brings the benefit that the apparatus to accomplish the present conveying and feeding method can be manufactured and provided with an economical cost.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A film cartridge conveying and feeding apparatus comprising:

a cartridge stopper means provided in a downstream end of a conveying path for receiving a film cartridge and conveying the first film cartridge in a first direction to a predetermined position, said cartridge stopper means comprising:

a first stopper member which stops said first film cartridge and then stops following film cartridges in turn;

a second stopper member which stops a second film cartridge adjacent to said first film cartridge when the first stopper member is moved to a release position;

a driving portion for driving said first and said second stopper members synchronously with each other; and a flap located adjacent to the end of said conveying path and receives said first film cartridge when the first stopper member is moved to the release position and releases said first film cartridge so that the cartridge moves in a second direction different from the first direction and said flap is connected to said driving portion so as to be driven synchronously with the stopper means.

2. A film cartridge conveying and feeding apparatus as claimed in claim 1, wherein said conveying path comprises an endless belt and a guide member provided along said endless belt.

3. A film cartridge conveying and feeding apparatus as claimed in claim 2, further comprising a cartridge detecting sensor installed at a stop position where said first film cartridge is stopped by the first stopper means in the downstream end of said conveying path in order to detect whether the cartridge is there or not and said driving portion being responsive to a detecting signal from said cartridge detecting sensor.

4. A film cartridge conveying and feeding apparatus as claimed in claim 3, wherein said conveying path is a second conveying path to whose upstream side is connected with a first conveying path crossing at right angles to the second conveying path and a plurality of cartridges are sent aligned from said first conveying path to the second conveying path.

5. A film cartridge conveying and feeding apparatus as claimed in claim 2, wherein said conveying path is a second conveying path to whose upstream side is connected with a first conveying path crossing at right angles to the second conveying path and a plurality of cartridges are sent aligned from said first conveying path to the second conveying path.

6. A film cartridge conveying and feeding apparatus as claimed in claim 1, further comprising a cartridge detecting sensor installed at a stop position where said first film cartridge is stopped by the first stopper means in the downstream end of said conveying path in order to detect whether the cartridge is there or not and said driving portion being responsive to a detecting signal from said cartridge detecting sensor.

7. A film cartridge conveying and feeding apparatus as claimed in claim 6, wherein said conveying path is a second conveying path to whose upstream side is connected with a first conveying path crossing at right angles to the second conveying path and a plurality of cartridges are sent aligned from said first conveying path to the second conveying path.

8. A film cartridge conveying and feeding apparatus as claimed in claim 1, wherein said conveying path is a second conveying path to whose upstream side is connected with a first conveying path crossing at right angles to the second conveying path and a plurality of cartridges are sent aligned from said first conveying path to the second conveying path.

9. A film cartridge conveying and feeding apparatus as claimed in claim 1, wherein said flap is a rotatable flap whereby the film cartridge can smoothly change directions upon operation of said rotatable flap.

10. A film cartridge conveying and feeding apparatus as claimed in claim 1, wherein said flap transfers individual film cartridges based on movement of said flap, whereby the individual film cartridges are smoothly transferred in the second direction.

11. A film cartridge conveying and feeding apparatus as claimed in claim 1, further comprising a cartridge housing unit disposed around said flap, said cartridge housing unit comprising an interior passage for allowing the film cartridge to be smoothly transferred after passing said flap.

12. A film cartridge conveying and feeding apparatus comprising:

a cartridge stopper means provided in a downstream end of a conveying path for receiving a film cartridge and conveying the first film cartridge in a first direction to a predetermined position, said cartridge stopper means comprising:

a first stopper member which stops said first film cartridge and then stops following film cartridges in turn;

a second stopper member which stops a second film cartridge adjacent to said first film cartridge when the first stopper member is moved to a release position;

a driving portion for driving said first and said second stopper members synchronously with each other;

a rotatable flap located adjacent to the end of said conveying path and receives said first film cartridge when the first stopper member is moved to the release position and releases said first film cartridge so that the cartridge moves in a second direction different from the first direction and said rotatable flap is connected to said driving portion so as to be driven synchronously with the stopper means; and a cartridge housing unit disposed around said rotatable flap, said cartridge housing unit comprising an interior passage for allowing the film cartridge to be smoothly transferred after passing said flap.

* * * * *